United States Patent [19]
Remongin

[11] Patent Number: 5,975,870
[45] Date of Patent: Nov. 2, 1999

[54] GAS INJECTOR FOR THE MOLDING OF PLASTIC HOLLOW PARTS

[75] Inventor: Bruno Remongin, Lengres, France

[73] Assignee: Becker Group Europe GmbH, Wuppertal, Germany

[21] Appl. No.: 08/611,622

[22] Filed: Mar. 6, 1996

(Under 37 CFR 1.47)

[30] Foreign Application Priority Data

Mar. 6, 1995 [FR] France ................................ 95 02587

[51] Int. Cl.⁶ ........................................................ B29L 45/17
[52] U.S. Cl. ........................... 425/130; 264/572; 425/546; 425/562
[58] Field of Search ................................ 425/533, 130, 425/546, 562, 563; 264/572, 328.12, 328.13

[56] References Cited

U.S. PATENT DOCUMENTS

| | | | |
|---|---|---|---|
| 5,054,689 | 10/1991 | Hunerberg et al. | 264/572 |
| 5,162,230 | 11/1992 | Ziegler et al. | 425/533 |
| 5,198,238 | 3/1993 | Baxi | 425/130 |
| 5,364,252 | 11/1994 | Hlaugty et al. | 264/572 |
| 5,458,846 | 10/1995 | Carroll | 264/572 |
| 5,466,141 | 11/1995 | Eckardt et al. | 264/572 |
| 5,511,967 | 4/1996 | Berdan | 425/533 |

FOREIGN PATENT DOCUMENTS

| | | |
|---|---|---|
| 0435025 | 7/1991 | European Pat. Off. . |
| 9323228 | 11/1993 | WIPO . |
| 9407675 | 4/1994 | WIPO . |

*Primary Examiner*—Patrick Ryan
*Assistant Examiner*—Joseph Leyson
*Attorney, Agent, or Firm*—Harness, Dickey & Pierce, P.L.C.

[57] ABSTRACT

A gas injector including a tube extending into the hollow enclosure of a housing. The hollow enclosure of the housing is connected with gas pressure. The outside end of the tube being extendable into the cavity of a plastic material injection mold. That end of the tube defines a valve seat. A valve is seatable on the seat. A rod on the valve extends through the tube into the hollow enclosure of the housing. A spring in a cup shape support normally urges the rod to move the valve onto the valve seat. A solenoid plunger acting on the rod and activated by an electromagnet moves the rod against the spring to raise the valve off the valve seat.

8 Claims, 1 Drawing Sheet

GAS INJECTOR FOR THE MOLDING OF PLASTIC HOLLOW PARTS

BACKGROUND AND SUMMARY OF THE INVENTION

The present invention relates to a gas injector for molding plastic hollow parts in an injection mold.

The injector includes a housing with a hollow enclosure or cavity within the housing.

The injector of the invention includes a tube connected through the hollow enclosure with a source of pressurized gas. The tube is designed to open out at its end into the cavity of an injection mold for molding plastic material to cause swelling of the plastic material and for making a hollow molded part. At that open end, the tube forms the seat of a sealing valve. The valve has a rod that extends inside the tube. A spring acting on the rod effects closure of the valve against the seat. This rod is also subject to the action of a type of motor means which are equipped with control means to open the valve against the spring force.

According to another feature of the invention, the spring is mounted in the enclosure or the cavity to surround the rod. One end of the spring bears against a cup which is integral with the rod and the other end bears against an end of the cavity.

The motor means comprises an electromagnet with a solenoid plunger. The electromagnet mounted at the other end of the enclosure from the valve causes the plunger to act axially on the rod to open the valve against the spring force.

Accordingly, the present invention has for its object the production of a gas injector with reliable operation, and particularly without the danger of the injection tube becoming clogged with plastic material that might flow back into the injection tube. Such flow back would in each case require the molding machine to be stopped causing loss of productivity associated with the time spent on taking down, cleaning and replacing the injectors.

Correct operation of the injector without clogging, even only without partial clogging, also produces better quality molded parts and assures constant quality. This substantially reduces the number of defective parts, which might have to be scrapped.

The improvement results from the fact that the injector of the invention makes it possible to bring a volume of gas that is constant from one operation to the next into the cavity of the mold within a specific period. This enables production of a hollow part of specific volume and shape to be repeated from one hollow part to the next, without the plastic part presenting local wall areas of a thickness that is abnormally too thin or too thick. This would create areas of too rapid cooling or too slow cooling on the part, resulting, at the very least, in appearance faults of the molded part.

BRIEF DESCRIPTION OF THE DRAWING

Other objects and features of the invention are illustrated by an example shown in the sole drawing, FIG. 1, which is an axial section of a gas injector according to the invention.

DETAILED DESCRIPTION OF THE INVENTION

Figure 1:
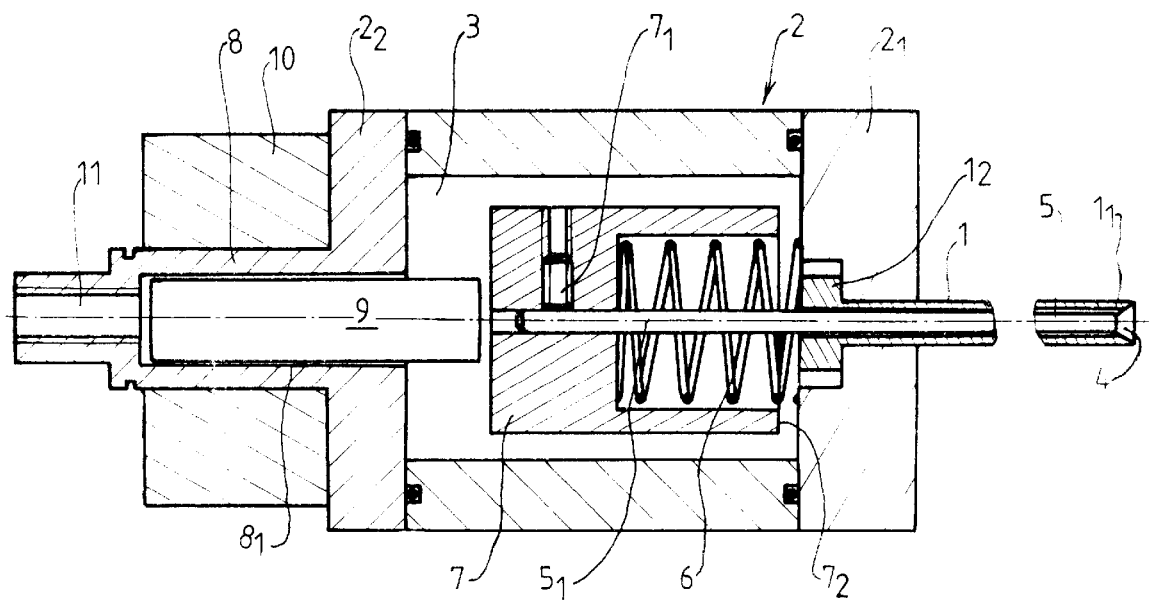

The injector of the invention is comprised of a tube 1, which has a free end $1_1$, at the right in the drawing. That end is inserted inside the cavity of a mold (not shown) for injection molding a hollow plastic part. The tube 1 is fixed at its other end $1_2$ in the end flange $2_1$ of a cylindrical body 2. The body 2 defines a hollow enclosure or cavity 3 which thus communicates with the inside end of the open tube 1.

The outside end $1_1$ of the tube 1 has the shape of a conical valve seat upon which a sealing valve 4 is applied. The valve 4 is integral with a rod 5. The diameter of the rod 5 is smaller than the inner diameter of the tube 1 which allows flow through the tube and past the rod of pressurized gas that is intended to inflate the plastic material that is injected into the cavity of the mold from another direction.

Sealing of the tube 1 by application of the valve 4 against the conical seat $1_1$ is obtained by a coil spring 6 that is situated around the inside end $5_1$ of the rod 5 which extends inside the hollow cavity 3. The spring 6 is thus compressed between the end flange $2_1$ of the body 2 and the bottom of a cylindrical shape cup 7 fixed on the end of the rod 5 by a fixing screw $7_1$. The cup centers the spring. The depth of the cup up to its edge $7_2$ determines the maximum height of lift of the valve 4 off the seat.

The end flange $2_2$ of the body 2 is fitted with a hollow sleeve 8, which protrudes axially. The sleeve has a cylindrical housing $8_1$ which accommodates, with clearance and with free sliding, a solenoid plunger 9 of an electromagnet. The coil 10 of the magnet is arranged around the sleeve 8. The supply of electricity to the coil 10 of the electromagnet causes the solenoid plunger 9 to move toward and against the cup 7 which then opens the valve 4 against the force of the spring 6.

Control over the opening and the closing of the sealing valve may therefore be set at very precise times within the molding cycle, culminating also in a better quality of the molded hollow parts obtained.

Pressurized gas is injected through the tube 1 into the cavity of the mold to cause swelling of the plastic material in the mold and to apply the material against the wall of the mold. The gas is introduced into the mold through the cavity 3 and the housing $8_1$ as the end of the housing is provided with an axial hole 11 that is connected to a source of pressurized gas. Thus, the pressurized gas flows through the annular space left free in the housing $8_1$ around the solenoid plunger 9.

Although the present invention has been described in relation to one embodiment thereof, many other variations and modifications and other uses will become apparent to those skilled in the art. It is preferred, therefore, that the present invention be limited not by the specific disclosure herein, but only by the appended claims.

What is claimed is:

1. A gas injector for injecting gas into a mold for molding hollow parts of plastic material, the gas injector comprising:

a housing defining a hollow enclosure within the housing;

a tube of a length to extend both into the housing enclosure and out of the housing, the tube having an end in the housing enclosure providing a gas pathway into the tube, the portion of the tube out of the housing being adapted to be received into the cavity of an injection mold; the tube having an end out of the housing having a valve seat thereon;

a sealing valve at the valve seat, a rod extending through the tube from the sealing valve into the hollow enclosure of the housing;

a spring connected with the rod normally urging the rod to move the valve onto the valve seat and close the valve for closing the pathway through the tube;

an electromagnet at the housing and means at the rod for being acted upon by the electromagnet for moving the rod to open the valve; and the electromagnet including a solenoid plunger within the hollow enclosure and a coil outside the hollow enclosure for acting on the solenoid plunger to activate the solenoid plunger to move the rod to move the valve off the valve seat, and wherein the solenoid plunger is supported in the hollow enclosure with a clearance around the plunger defining a pathway for gas to enter the hollow enclosure, a duct into the housing and into the clearance around the solenoid plunger leading into the enclosure, and the valve sealing the gas pathway through the tube.

2. The injector of claim 1, wherein the rod extending through the tube is of a smaller diameter than the tube for permitting gas passage through the tube passed the rod.

3. The injector of claim 1, further comprising a gas inlet opening in the housing into the hollow enclosure.

4. The injector of claim 1, wherein the valve seat has a conical shape.

5. A gas injector for injecting gas into a mold for molding hollow parts of plastic material, the gas injector comprising:

a housing defining a hollow enclosure within the housing;

a tube of a length to extend both into the housing enclosure and out of the housing, the tube having an end in the housing enclosure providing a gas pathway into the tube, the portion of the tube out of the housing being adapted to be received into the cavity of an injection mold; the tube having an end out of the housing having a valve seat thereon;

a sealing valve at the valve seat, a rod extending through the tube from the sealing valve into the hollow enclosure of the housing;

a spring connected with the rod normally urging the rod to move the valve onto the valve seat and close the valve for closing the pathway through the tube;

an electromagnet at the housing and means at the rod for being acted upon by the electromagnet for moving the rod to open the valve; and the electromagnet including a solenoid plunger within the hollow enclosure and a coil outside the hollow enclosure for acting on the solenoid plunger to activate the solenoid plunger to move the rod to move the valve off the valve seat; and means on the rod for defining the maximum extent to which the solenoid plunger may shift the rod to raise the valve off the valve seat;

wherein the means on the rod comprises a cylindrical body in the housing to which the rod is secured and the body having a cup shaped opening, the spring being disposed in the cup shaped opening and pressing on the one hand against the bottom of the cup shaped opening and on the other hand against the housing opposed to the bottom of the cup shaped opening; and the depth of the cup shaped opening being selected for defining the maximum extent to which the solenoid plunger may move the rod to raise the valve off the valve seat.

6. The injector of claim 5, wherein the rod extending through the tube is of a smaller diameter than the tube for permitting gas passage through the tube past the rod.

7. The injector of claim 5, further comprising a gas inlet opening in the housing into the hollow enclosure.

8. The injector of claim 5, wherein the valve seat has a conical shape.

* * * * *